April 25, 1939.     F. C. PEARSON     2,155,869

WHEEL BOLT

Filed March 17, 1937

Inventor
Frank C. Pearson
By Blackburn, Spencer & Hink
Attorneys

Patented Apr. 25, 1939

2,155,869

UNITED STATES PATENT OFFICE 2,155,869

WHEEL BOLT

Frank C. Pearson, Flint, Mich., assignor to General Motors Corporation, Detroit, Mich., a corporation of Delaware Application March 17, 1937, Serial No. 131,359

2 Claims. (Cl. 301—6)

This invention relates to brakes and particularly to brakes associated with the wheels of vehicles.

An object of the invention is to provide means for readily removing dust and foreign matter from within the drums of wheel carried brakes.

Another and related object is to provide for such removal of foreign matter by means which shall be inexpensive and which shall permit the clearing of the drum of dust and dirt in a most expeditious manner requiring the simplest sort of manipulation.

The invention is shown in an accompanying drawing in which

Figure 1:
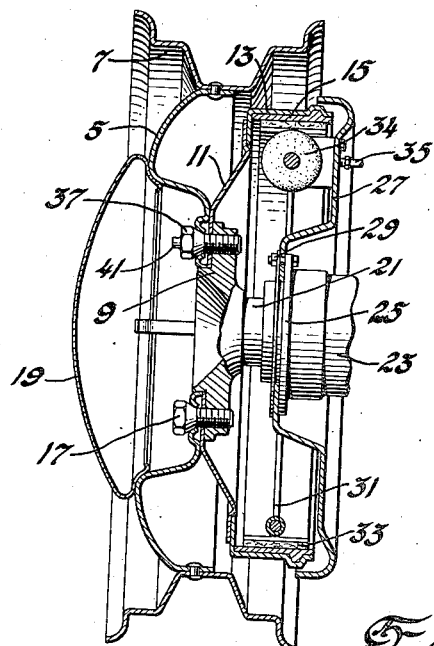
Fig. 1 is a transverse section through a wheel and drum, the novel structure of this invention being shown.

Referring by reference characters to the drawing, there is shown a wheel having a disc 5, a rim 7 and a hub 9. With the wheel is a brake drum comprising a bottom disc 11 and a ring 13, the latter having a liner 15. The drum and the wheel disc are secured to the hub by bolts such as 17. Access to the bolts 17 for removing the wheel from the hub is had by a hub cap 19 removably attached to the disc in a preferred or conventional way. The wheel may be rotated by a driven axle shaft 21 within an axle housing 23. As is usual, the housing has a flange 25 to which is secured a cover plate 27 for the drum. Fastening means 29 serve as the fastening means. The cover plate, being stationary, is extended toward but is spaced slightly from the edge of the rotatable drum. Within the drum are shoes marked 31 having friction facing 33. They are to be spread into contact with the drum by any desired form of applying means. At 34 there is shown a cylinder adapted to be supplied by hydraulic fluid by means of a conduit 35 from a conventional form of master cylinder. This brake mechanism is no part of the invention and is only briefly described to show the sort of device with which the invention is concerned.

Figure 2:
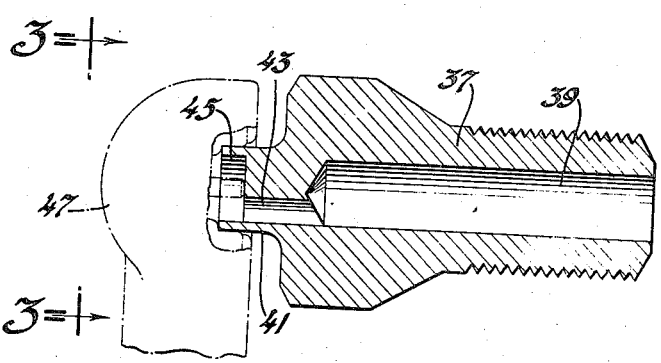
Fig. 2 is a longitudinal section of a modified securing means for the brake drum.
Figure 3:
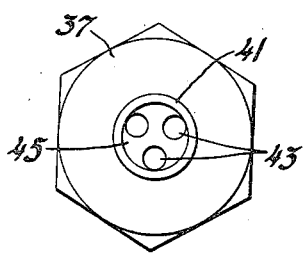
Fig. 3 is a view as seen from line 3—3 of Fig. 2.

It is well known that dust and dirt and foreign matter get into the drum. Such foreign matter may become imbedded in the friction facing of the shoes and damage the surface of the drum engaged thereby. For the purpose of removing such foreign matter it is proposed to blow it out by means of air under pressure. To that end there may be substituted for one of the wheel bolts 17 a special bolt 37 best shown in Figure 2. This bolt is much like bolt 17 insofar as its function for securing the wheel disc and drum disc to the hub is concerned. It is modified by the provision of a central chamber 39 which, when assembled, is in communication with the drum enclosure. The special bolt has a reduced head extremity 41 through which extends one or more passages 43 affording communication between chamber 39 and an end recess 45. Fig. 2 shows in dotted lines, a fitting 47 such as is used on the end of the air pressure hose to be found at every gasoline station. It is only necessary to remove the hub cap 19 and apply the fitting 47 to the end of special bolt 37 in order to blow the dust and dirt from within the drum out through the space between the drum and the cover plate.

I claim:

1. In combination with a wheel and brake drum, means to secure said wheel and drum, said means extending into the brake drum and having a through passage whereby air may be forced into the drum to remove foreign matter.

2. In combination with a wheel, a hub, and brake drum, means to secure said elements together at least one of said means extending into the brake drum and having a through passage whereby air pressure may be delivered to the drum enclosure through said passage.

FRANK C. PEARSON.